Nov. 16, 1971     C. LATOUR     3,620,044

POWER TRANSMITTING SYSTEM

Filed Jan. 22, 1970

Inventor:
Claude Latour
BY Baldwin Wight Diller & Brown
Attorneys

United States Patent Office 3,620,044
Patented Nov. 16, 1971

3,620,044
POWER TRANSMITTING SYSTEM
Claude Latour, Garches, France, assignor to Société a Responsabilite Limitee Société d'Etudes et de Developpement Industriel Proclem, Levallois-Perret, France
Filed Jan. 22, 1970, Ser. No. 4,992
Claims priority, application France, Jan. 31, 1969, 6902194
Int. Cl. F16d 3/64
U.S. Cl. 64—14
7 Claims

ABSTRACT OF THE DISCLOSURE

Cyclic irregularities in the angular velocity of the drive to a rotational coupling are compensated for by providing angular play in the coupling equal to the peak to peak amplitude of the irregularities in angular displacement of the drive member of the coupling. The coupling comprises inner and outer members having complementary recesses or projections on their facing surfaces, forming housing for coupling members dimensioned to permit the desired angular play. The coupling members are preferably cylindrical and may be of elastic material.

---

This invention relates to a rotary drive coupling adapted to compensate for cyclic irregularities in the angular velocity of a driving element and/or driven element to be connected together.

Cyclic irregularities in angular velocity occur in all motors to varying degrees, particularly at low speeds, and give rise to more or less serious difficulties in the operation of the loads which they are intended to drive; the problem is particularly acute with internal combustion engines of the diesel type.

These irregularities cause torque reversals which give rise to shock loadings in the drive train, which in turn give rise either to noise or more often, in addition to such noise, rapid partial or often complete deterioration of the coupling means between the motor and its load, or of the apparatus forming the load.

Numerous attempts have been made to overcome or at least to alleviate these difficulties (for example by means of flywheels, belts and special clutches), but hitherto it has not been possible to solve the problem in an industrially and economically practicable manner.

A study of the operation of motors having an output showing cyclic irregularities in angular velocity shows that by plotting the actual angular velocity of the output shaft of the motor against time, a curve of generally sinusoidal form is obtained as a result of the cyclic irregularities in the angular velocity of the output shaft. The rising portions of this curve correspond to acceleration of the output shaft and the falling portions correspond to deceleration of the output shaft.

Examination of such a curve overlaid on a second curve showing the mean angular velocity of the driven element, i.e. a straight line, led to the idea which is the basis of the present invention, namely to permit the transmission of forces only under circumstances in which the first curve lies above the second curve, that is to say during those periods in which the rotation of the motor tends to lead the load, whilst decoupling the load under conditions in which the rotation of the load tends to lead that of the motor.

This object may be obtained according to the invention by rendering the driving and driven elements in a rotational coupling relatively rotationally displaceable through an angle corresponding to the maximum peak to peak amplitude of the cyclic irregularities in the angular displacement of one of said elements. It has been found that with such a coupling the disadvantages mentioned above, that is to say noise and mechanical deterioration, can be effectively eliminated.

A coupling compensated according to the invention may be used either in conjunction with a gearbox or speed variator or otherwise.

Such a coupling is particularly advantageous in installations containing a freewheel; in a freewheel each cycle of irregularity is liable to cause an operative cycle of the freewheel, and thus, when a coupling compensated according to the invention is not provided, the freewheel mechanism has a very substantially shortened life in comparison with the life specified by its manufacturer, which specification takes into account only operative cycles required by the use to which the freewheel is put.

The invention extends to a coupling comprising inner and outer concentric elements, one being the driven element and the other the driving element, the inner element being formed with projections or recesses in its outer periphery and the outer element being formed with complementary projections or recesses in its inner periphery, the projections or recesses in the two members cooperating to form housings accommodating floating coupling elements engaging a recess or projection both in the inner and outer elements, the coupling elements and recesses or projections being disposed parallel to the common axis of the coupling and being dimensioned to allow angular play between the driving and driven elements through an arc corresponding to the maximum peak to peak amplitude of the angular displacements resulting from cyclic irregularities in the angular velocity of one of said elements.

There are described below two embodiments of apparatus according to the invention, with reference to the accompanying drawing, in which.

Figure 1:
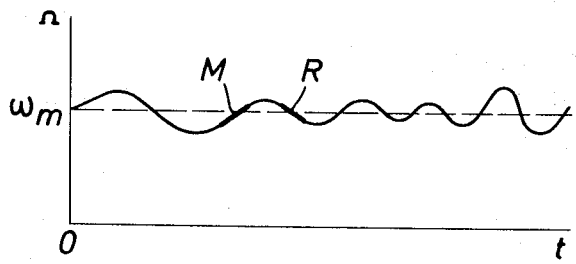
FIG. 1 is a graph in which the rotational velocity $\Omega$ of a motor driving a load and the mean rotational velocity $\omega_m$ of the load are plotted against time.

Referring to FIG. 1, the generally sinusoidal curve shows the angular velocity $\Omega$ of the motor shaft plotted against time $t$, the generally sinusoidal nature of the irregularities in velocity being evident, resulting in alternate accelerations and decelerations of the load if tightly coupled to the motor. The means velocity $\omega_m$ of a tightly coupled load is shown by the broken line.

Figure 2:
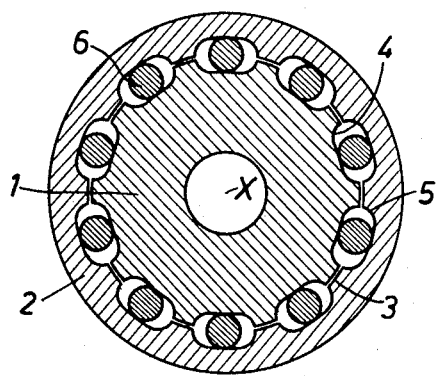
FIG. 2 is a view in cross-section of a first form of coupling.

In the embodiment illustrated in FIG. 2, a driving element 1 drives a driven element 2 about their common axis X, in such a manner as to leave a gap 3 between them.

On the inner periphery of the driving element 1 and on the outer periphery of the driven element 2 there are formed recesses 4 and 5 respectively, the dimensions of which are determined in the manner explained in detail further on.

Each pair of recesses 4, 5 houses a member 6 which may be a cylinder, roller or needle and is permitted to move freely in the housing formed by the recesses 4, 5 so as to provide a degree of play in the coupling accommodating the cyclical irregularities in the angular displacement of the driving element 1.

Figure 3:
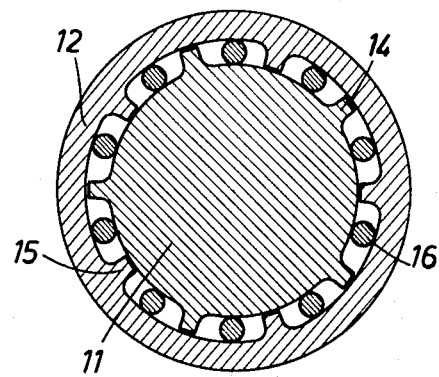
FIG. 3 is a similar view of an alternative form.

In FIG. 3 a driving element 11 drives a driven element 12; these elements are here formed in such a manner that the driving element 11 has a certain number of equidistant projections 14 and the driven element has an equal number of equidistant projections 15, each projection 14 being situated between two projections 15, and vice versa.

The radial extent of the projections is such that chambers are formed between two projections 14 and 15 and the corresponding internal periphery of the element 11 and the external periphery of the element 12, the chambers constituting housings receiving members 16 similar to the members 6 in the embodiment illustrated in FIG. 2.

If it is assumed that the motor driving the drive element 1 (or 11) has an irregularity in angular velocity that causes angular cyclical irregularity in angular displacement of N° relative to the angular position it would occupy at any moment if rotated at the mean velocity of the load, the recesses 4, 5 or the projections 14, 15 and the member 6 or 16 are dimensioned so as to provide angular play in the coupling of 2N°, i.e. the peak to peak value of the cyclic irregularities in angular displacement.

Figure 4:
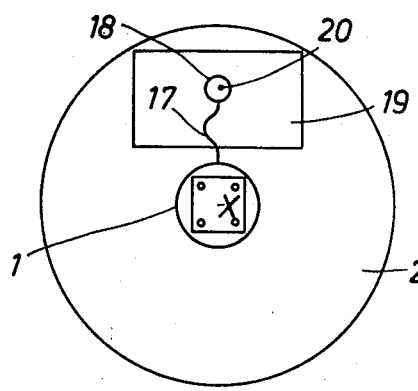
FIGS. 4 and 5 illustrate respectively an apparatus and the curve which it supplies for the purpose of determining the maximum angular amplitude of the cyclical irregularities.
Figure 5:
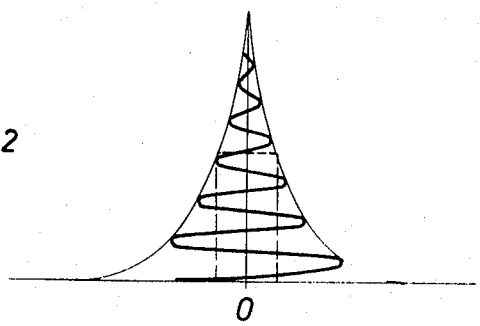

The value of the angle N° used may be that supplied by the maker of the motor, which is generally very approximate, but it is preferable and very easy to determine this angle accurately in each case. This may be carried out as follows: apparatus as shown in FIG. 4 is utilized comprising a thin elastic member 17 attached at one end to a spherical mass 18 and at its other end to the drive member 1. On a face of the driven member 2 perpendicular to its axis there is fastened by any suitable means a sheet of paper 19 disposed symmetrically in relation to the position of rest of the blade 17. The mass 18 is provided with a marking or inking stylus 20 bearing against the paper. When the motor is started up, the member is displaced from its position of equilibrium by the acceleration applied therethrough to the mass 18 so as to permit the latter to move in an arc, and is stretched by the action of the mass 18 as the angular velocity increases so that the mass 18 moves away from the axis X. Thus the stylus 20 plots on the paper 19 a graph of displacements caused by variations in angular acceleration, against angular velocity, as shown in FIG. 5. There is thus recorded on the sheet of paper a curve, which is shown in FIG. 5, from which it is possible to measure directly, for each motor speed, the exact value of the angle N° defining the cyclical irregularity.

The operation of a coupling according to the invention is as follows. When a motor connected to the driving element 1 (11) turns and drives a load connected to the driven element 2 (12), the members 6 (16) tend to be displaced in their respective housings in a forward direction (in the direction of rotation) during those portions of the rotation of the motor corresponding to the portions M of the solid line curve lying above the broken line curve in FIG. 1 and are displaced towards the rear of these sockets in the portions R of the curve lying below the broken line. Once the forward movement of the elements is such that the play in the coupling is taken up, drive is transmitted. When the motor is running at a steady mean velocity, some drive must be transmitted to the load and thus it may be assumed that at the point where the solid curve drops through the broken line in FIG. 1, i.e. when the velocity of the drive motor falls below that of the load, the member 6 (16) have moved forward to the greatest possible extent and the walls of the recesses 4, 5 or the projections 14, 15 are in engagement via the members 16. As the portion of the curve beneath the broken line is entered, i.e. the motor is rotating more slowly than the load, the various parts will commence to move apart, and will continue to move apart as long as the angular velocity of the motor is less than that of the load. Since the play in the coupling is equal to the peak to peak irregularity in angular displacement of the drive member relative to its displacement were it driven at its mean velocity, the play in the coupling will take up the full extent of this separation without taking up drive in the opposite direction. As the curve again moves above the broken line, the drive member 1 (or 11) commences to catch up with the driven member 2 (or 12) until, assuming the angular velocity of the load to have remained constant, the various parts involved again take up drive in the forward direction as the curve again crosses the broken line in the downward direction. In practice, the load will have lost velocity due to energy absorption therein, and drive will be taken up somewhat earlier, how much earlier depending on the magnitude of the load and its inertia.

It will be understood therefore that loadings on the drive train and load due to decelerations caused by cyclic irregularities in the velocity of the motor will be wholly eliminated, whilst those due accelerations similarly caused will be substantially reduced, the reduction being greater the greater the inertia of the load relative to its energy absorption. Since the risk of noise and damage is greatest when the inertia of the load is greatest, this is a substantial advantage. It will be appreciated that the loading applied to the motor may affect the magnitude of the cyclic irregularities in its output, and this must be taken into account in applying the invention.

When in accordance with another feature of the invention use is made of member 6 or 16 made of elastic material, certain parasitic vibrations are additionally absorbed. The arrangement according to FIGS. 2 and 3, in which the members 6 and 16 are of round cross section, offers the advantage of eliminating shearing stresses on these members, which is particularly advantageous when elastic materials are used therefor.

The embodiments described have utilized member 6, 16 of cylindrical form; it should be understood that these elements may be conical in form when it is desired to provide homokinetic torque transmission in a non-homokinetic drive train (arising for example because of the non-parallelism of the shafts).

Additionally, the elements 6, 16 described could be replaced by arangements in which the housings formed by the recesses 4, 5 or the projections 14, 15 accommodate elastic members of composite construction comprising components of very high elasticity so as to permit the desired play and components of very low elasticity to take up the drive stresses when torque is being transmitted through the coupling.

It will be understood that whilst for the purposes of description it has been assumed that the cyclic irregularities are in the angular velocity of the driving element, the invention is equally applicable when the irregularities are associated with the driven element.

What I claim is:

1. A method of compensating for cyclical irregularities in the angular velocity of one of the elements of a rotational coupling comprising a drive element and a driven element comprising rendering the driving and driven elements of such a coupling relatively rotationally displaceable through an angle corresponding to the maximum peak to peak amplitude of the cyclic irregularities in the angular displacement of one of said elements.

2. A rotational coupling comprising inner and outer concentric elements, one being the driven element and the other the driving element, the inner element being formed with projections or recesses in its outer periphery and the outer element being formed with complementary projections or recesses in its inner periphery, the projections or recesses in the two members cooperating to form housings accommodating floating coupling elements engaging a recess or projection both in the inner and outer elements, the coupling elements and recesses or projections being disposed parallel to the common axis of the coupling and being dimensioned to allow rotational angular play between the driving and driven elements through an arc corresponding to the maximum peak to peak amplitude of the angular displacements resulting from cyclic irregularities in the angular velocity of one of said elements.

3. A coupling according to claim 2 wherein the coupling elements are cylindrical.

4. A coupling according to claim 2 wherein the coupling elements are of elastic material.

5. The method as defined in claim wherein the maximum peak to peak amplitude is defined by a generally first sinusoidal curved line having maximum peak acceleration and maximum peak de-acceleration with the mean angular velocity being a second straight line therebetween including the step of transmitting rotational forces between the drive and driven elements only when the first line lies above the second line.

6. A coupling according to claim 2 wherein the coupling elements are of rigid material.

7. A coupling according to claim 3 wherein said cylindrical coupling elements are rigid material.

References Cited

UNITED STATES PATENTS

| | | | |
|---|---|---|---|
| 1,972,779 | 9/1934 | Kradoska | 64—9 |
| 2,873,590 | 2/1959 | Croset | 64—14 |
| 3,148,756 | 9/1964 | Romanini | 64—27 X |
| 3,313,125 | 4/1967 | Hein | 64—27 X |
| 3,386,264 | 6/1968 | Paulsen | 64—27 X |

KENNETH W. SPRAGUE, Primary Examiner

U.S. Cl. X.R.

64—27 NM